(12) United States Patent
Montero

(10) Patent No.: US 9,916,021 B2
(45) Date of Patent: Mar. 13, 2018

(54) INFORMATION HANDLING SYSTEM VIRTUALIZED POINTING DEVICE SUPPORT BETWEEN MULTIPLE PROTOCOLS

(71) Applicant: Dell Products L.P., Round Rock, TX (US)

(72) Inventor: Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 301 days.

(21) Appl. No.: 14/813,309

(22) Filed: Jul. 30, 2015

(65) Prior Publication Data

US 2017/0031464 A1    Feb. 2, 2017

(51) Int. Cl.
*G06F 3/038* (2013.01)
*G06F 3/0354* (2013.01)

(52) U.S. Cl.
CPC .......... *G06F 3/038* (2013.01); *G06F 3/03543* (2013.01); *G06F 3/03547* (2013.01)

(58) Field of Classification Search
CPC ... G06F 3/03543; G06F 3/03547; G06F 3/038
USPC ......................................... 345/163
See application file for complete search history.

(56) References Cited

U.S. PATENT DOCUMENTS

2006/0282576 A1* 12/2006 Hsu ................. G06F 13/387
                                                     710/62
2014/0035816 A1*  2/2014 Liao ................ G06F 3/0488
                                                     345/163

* cited by examiner

*Primary Examiner* — Tony Davis
(74) *Attorney, Agent, or Firm* — Terrile, Cannatti, Chambers & Holland, LLP; Robert W. Holland

(57) ABSTRACT

An information handling system having a precision touch pad (PTP) touch input device interfaced through a multi-drop serial link with a processor sends information passing through the serial link to an embedded controller. The embedded controller translates the PTP information into legacy PS2 touch device inputs and forwards the inputs to the processor to provide touch inputs during states in which the processor cannot process information provided through the PTP serial link, such as when the operating system is not active or does not have native support for PTP.

24 Claims, 3 Drawing Sheets

INFORMATION HANDLING SYSTEM VIRTUALIZED POINTING DEVICE SUPPORT BETWEEN MULTIPLE PROTOCOLS

BACKGROUND OF THE INVENTION

Field of the Invention

The present invention relates in general to the field of information handling system input devices, and more particularly to an information handling system pointing virtualized pointing device support.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often accept end user inputs as touches made through a pointing device and presented on a display. Conventional pointing devices include a mouse, which translates movement detected at the mouse to movement of a cursor on a screen, and a touchpad, which translates movement on a touch sensitive surface into movement of a cursor on a screen. Both the mouse and the touchscreen typically have input buttons to accept end user inputs, such as left and right touch buttons, although a touchpad will also often indicate inputs with a tap made at the touch sensitive surface. The widespread adoption of touchscreen liquid crystal displays (LCD) has introduced another type of pointing device in which end users make touch inputs directly over displayed visual information. For example, tablet information handling systems are built into a planar housing without a physical keyboard so that a touchscreen acts as both a keyboard and a touchpad. Generally mobile devices have an integrated keyboard matrix to accept inputs from touchscreens and integrated keyboards.

Support for pointing devices within embedded controllers and firmware dates back to the first Apple products with "mouse" support. Similar support was included in IBM compatible and Windows systems using PS2 standard inputs for X86 processors that remain in use largely unchanged in many systems today. An embedded controller interfaced with the pointing device accepts PS2 input/output (I/O) in an (X, Y, Button) format over the 0x60 and 0x64 industry standard I/O channels. Since the embedded controller typically executes the basic input/output system (BIOS) firmware, pointing device inputs will generally operate in pre-operating system environments, such as DOS, with factory tools, and during system setup. Further, the basic functionality defined by the PS2 standards ensures that non-Windows devices can adapt to pointing devices of different vendors in a convenient manner, such as Linux and Android devices.

One difficulty that has come up with conventional pointing devices is that end users expect touchpads to provide functionality similar to that of a touchscreen display. In particular, end users expect multi-finger gesture support that provides richer input alternatives, such as rotating content, inputting security codes, writing letters and/or symbols. Although a typical touchpad has adequate sensitivity to accept inputs with multi-finger gestures, the standard PS2 communication protocol will not transfer adequate data bandwidth to communicate multi-finger gestures to a processor through an embedded controller. Instead, "Precision Touch Pad" requirements have been introduced to provide greater data transfer rates between the touchpad and CPU. To provide the necessary bandwidth to support gestures, manufacturers typically have to interface the touchpad to the CPU chipset through an I2C or USB serial link and let the operating system handle the more complex gesture inputs. Unfortunately, PS2 hardware and GPIO typically have to remain in the embedded controller to support legacy PS2 software stacks for managing inputs when the operating system is not active. Including I2C gesture support within an embedded controller for legacy pointing device functions would add significant complexity to the system.

SUMMARY OF THE INVENTION

Therefore, a need has arisen for a system and method which provides virtualized information handling system support between multiple touch device protocols, such as I2C and PS2.

In accordance with the present invention, a system and method are provided which substantially reduce the disadvantages and problems associated with previous methods and systems for communicating touch device inputs at an information handling system. A controller receives pointing device inputs in a first protocol, translates the pointing device inputs to a second protocol and forwards the pointing device inputs to a processor.

More specifically, an information handling system processes information stored in memory with an operating system executing on a processor. Information is input to the operating system as touches made through a touch device, such as a touch pad or mouse. The touch device communicates the touch inputs to the operating system through a serial link with the processor, such as an I2C serial link that communicates touch information in the Precision Touch Pad (PTP) protocol. The serial link has a multidrop topology with a feed into an embedded controller to mirror information sent through the serial link for use at the embedded controller. An I2C converter running on the embedded controller converts the PTP touch information into legacy PS2 mouse information and provides the converted information to a legacy mouse stack that, in turn, forwards the touch information to the processor. The legacy mouse stack accepts and processes the converted touch information as if it was received from a legacy touch device. When an operating system interfaces with the touch device directly, the operating system or touch device may disable the embedded controller from providing legacy mouse inputs.

The embedded controller may also automatically detect the operating system in an operational state and, in response, self-disable PS2 emulation.

The present invention provides a number of important technical advantages. One example of an important technical advantage is that an information handling system touch device that communicates touch inputs to an operating system will continue to accept and process touch inputs if an operating system is disabled, such as during boot, system setup, under factory tools, in DOS or in other pre-operating system states. The embedded controller runs existing legacy PS2 mouse firmware instructions that handle PTP information translated to the legacy format as if the PTP information was instead provided from a legacy touch input device. Leveraging existing legacy touch device firmware to support touch devices that input directly to an operating system reduces the cost and complexity of supporting touch device usage models when the operating system is not active.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system touch device selectively provides touch input information to a processor either directly or through an embedded controller based on whether an operating system is enabled or disabled. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
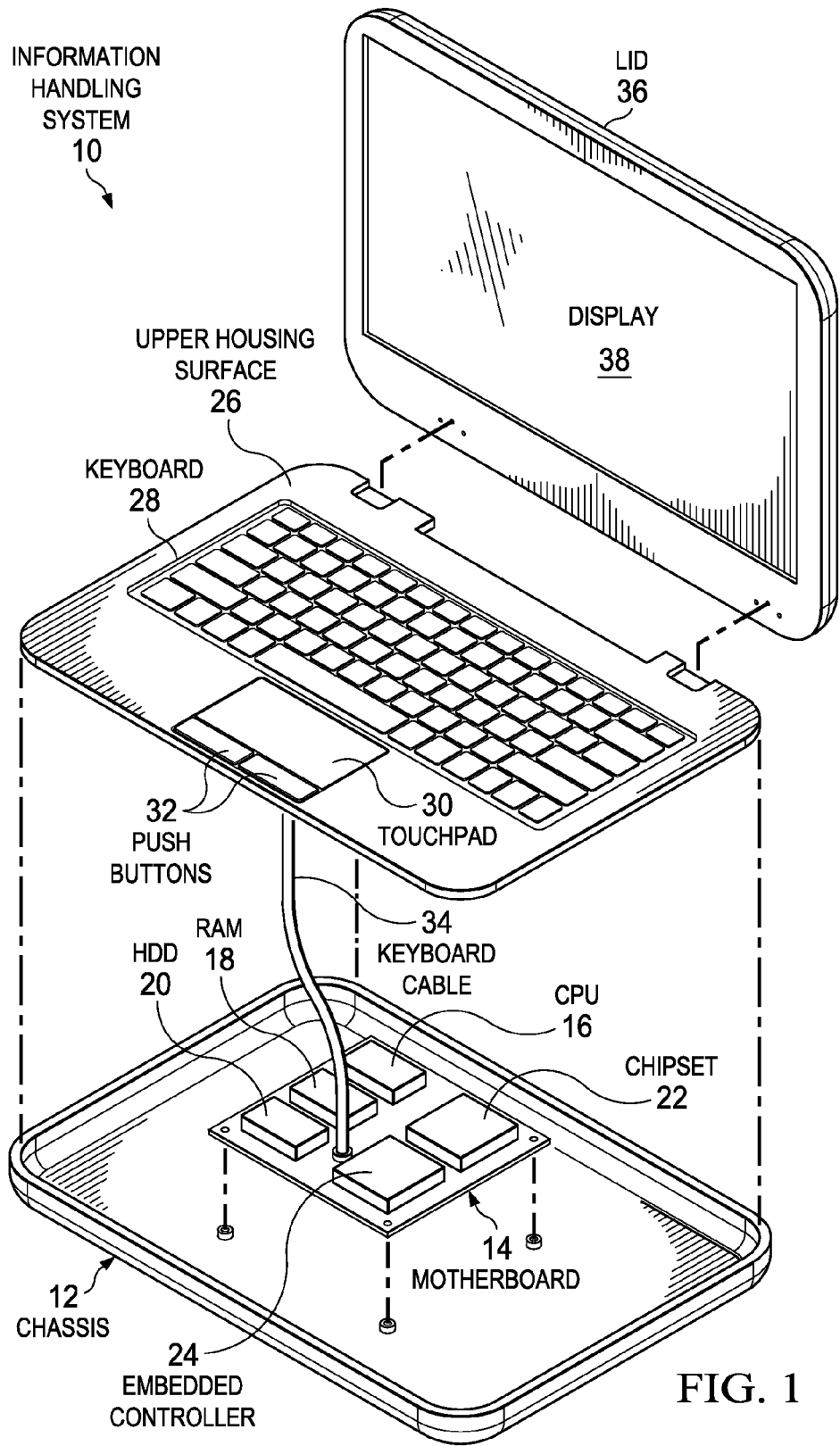
FIG. 1 depicts a blown up view of a portable information handling system having an integrated touch pad.

Referring now to FIG. 1, a blown up view depicts a portable information handling system 10 having an integrated touch pad 30. Information handling system 10 has a housing with a chassis 12 that holds a motherboard 14 having processing components interfaced for processing information. In the example embodiment, a central processor unit (CPU) 16 executes instructions to process information stored in random access memory (RAM) 18, such as for applications stored in persistent memory of a hard disk drive 20. A chipset 22 includes a variety of processing devices that execute firmware instructions to coordinate communications, such as a Basic Input/Output System (BIOS). An embedded controller 24, also sometimes known as a keyboard controller, is generally considered part of the chipset and executes BIOS instructions to manage interactions with input/output (I/O) devices. During normal operations, an operating system executing on CPU 16 processes inputs; however, the embedded controller is typically the processor that manages system operations when the operating system is not active, such as during BIOS setup, DOS modes, factory tool control and other pre-operating system functional states.

In the example embodiment, an upper housing surface 26 integrates a keyboard 28 and a touchpad 30 having one or more push buttons 32. A keyboard cable 34 interfaces keyboard 28 and touchpad 30 to motherboard 14. A lid 36 rotationally couples to chassis 12 and integrates a display 38 that presents information as visual images, such as a touchscreen that receives graphics from a graphics processor of chipset 22 and provides touch inputs to CPU 16 and/or embedded controller 24. In alternative embodiments, alternative types of housings may be used to contain the processing components, such as tablet or desktop types of configurations. Further, alternative types of I/O devices that accept inputs from a user as touches may be used, such as peripheral mouse, keyboard or similar types of devices.

As depicted in FIG. 1, touchpad 30 may provide data to processor 16 in a legacy PS2 mouse protocol or in a Precision Touch Pad (PTP) protocol through inputs in chipset 22. Essentially, the PS2 protocol mode is virtualized during times when the operating system is not present or does not have native support for the I2C PTP gesture processing. The legacy PS2 mouse protocol is supported with firmware code on embedded controller 24 that sends inputs with (x,y,button) information over the 0x60/0x64 standard I/O channel, such as at pin of a processor of chipset 22 as a general purpose input/output (GPIO). In the legacy x86 environment, the processor 16 receives the touch information from embedded controller 24 so that an operating system executing on the processor can apply the information as pointing and touching data. The PTP protocol is supported by the operating system with touch inputs sent through a serial interface that provides adequate bandwidth for complex touch inputs, such as multi-finger gestures. PTP touch information is communicated directly to the processor through a serial link and interpreted by the operating system. The example embodiment described herein provides touch information to processor 16 from PTP type touch input devices by leveraging the existing PS2 legacy touch input stack of embedded controller 24 to provide touch inputs from PTP touch devices when an operating system is not enabled and thus not capable of interpreting information arriving on the PTP serial link. In summary, the legacy touch device software stack on embedded controller 24 operates in an x86 domain for use when the operating system is disabled so processor 16 gets touch inputs, and touchpad 30 sends touch input information through a serial link directly to processor 16 when an operating system is enabled so that embedded controller 24 does not have to send touch input data.

Figure 2:
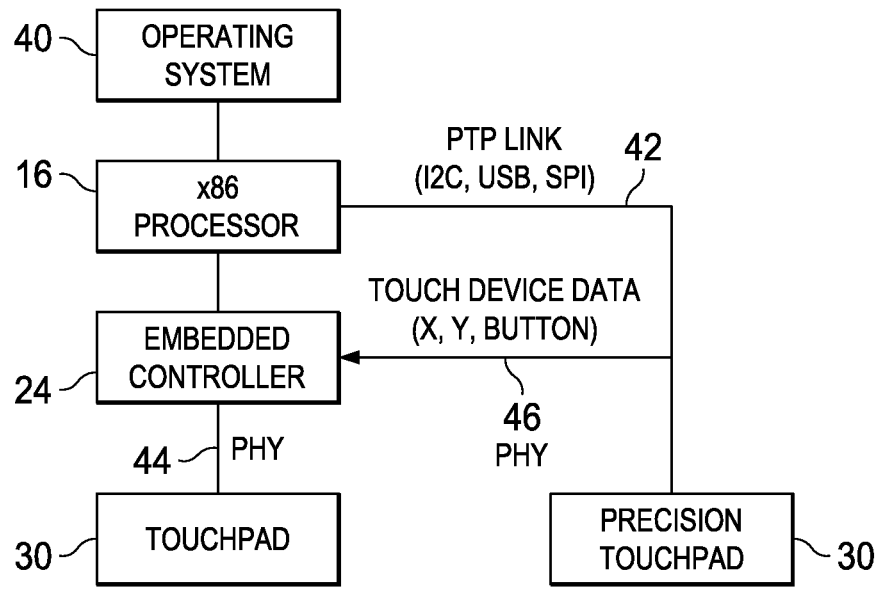
FIG. 2 depicts a functional block diagram of an information handling system that accepts legacy and PTP touch inputs.

Referring now to FIG. 2, a functional block diagram of an information handling system 10 that accepts legacy and PTP touch inputs. In the example embodiment, two touch pads 30 are depicted, one interfaced with processor 16 through an embedded controller 24 and the other interfaced directly with processor 16. An operating system 40 executes over processor 16 and applies touch input information for accepting end user inputs. A precision touch pad 30 has a PTP link 42 that sends touch information in a PTP protocol through a serial link, such as an I2C, USB, SPI or other interface. Operating system 40 interprets the touch information based on the PTP specification, although alternative types of touch input specifications could be used. Touch pad 30 directly interfaced with embedded controller 24 through phy 44 provides embedded controller 24 with touch input information using legacy PS2 formatted serial information. The presentation of two touchpads 30 illustrates the different communications involved with each; generally information handling systems will integrate one touchpad with one protocol.

PTP touchpad 30 has an I2C multidrop topology with a phy 46 that mirrors at embedded controller 24 communications provided between processor 16 and PTP touchpad 30. Embedded controller 30 accepts the inputs received at phy 46 to determine touch information sent from PTP touchpad 30 and communications sent from processor 16 and selectively applies the communications to send touch information from embedded controller 24 to processor 16 using a legacy PS2 I/O protocol. Thus, when operating system 40 is disabled processor 16 still gets touch inputs in legacy PS2 format usable by BIOS or other legacy software executing on processor 16; when newer operating system 40 is enabled, the legacy PS2 touch input information may be discontinued by a command from processor 16 directly to embedded controller 24, indirectly to embedded controller 24 through multidrop phy 46, or from PTP touchpad 30 once it establishes communication with operating system 40. The embedded controller 24 can alternatively self-terminate PS2 virtualized emulation when auto detection of the operating system indicates support is available from the operating system for PTP data.

Figure 3:
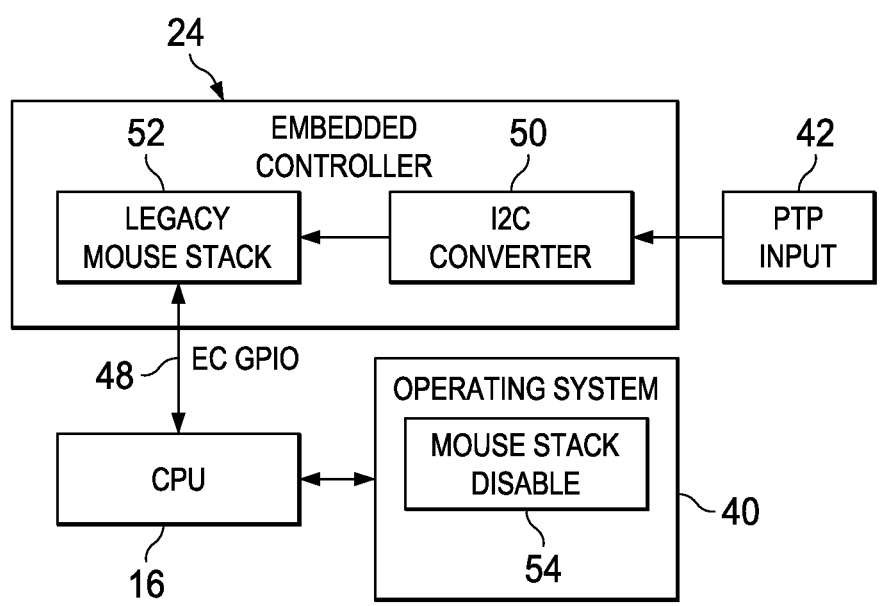
FIG. 3 depicts a functional block diagram depicting management of PTP touch inputs when an operating system is disabled.

Referring now to FIG. 3, a functional block diagram depicting management of PTP touch inputs when an operating system is disabled. PTP inputs 42 enter embedded controller 24 through a multidrop interface and are accepted at an I2C converter 50 that converts the PTP formatted information into legacy PS2 formatted information (x,y, button). I2C converter 50 passes the touch information to legacy mouse stack 52, which sends the touch information through GPIO 48 to CPU 16. While operating system 40 is disabled or otherwise fails to support PTP data, CPU 16 determines touch inputs using legacy PS2 standard I/O protocol. Once operating system 40 is enabled and accepting PTP inputs 42 directly from the touch input device, a mouse stack disable module 54 commands embedded controller 24 to cease sending legacy mouse touch information. Alternatively, operating system 40 ignores or otherwise discards the touch input information.

Figure 4:
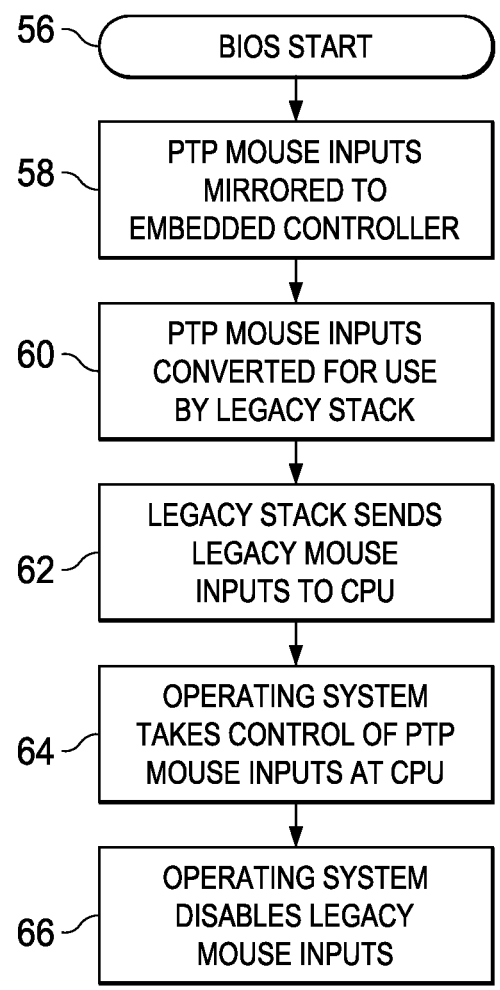
FIG. 4 depicts a flow diagram of process for transitioning from legacy touch inputs to operating system managed touch inputs.

Referring now to FIG. 4, a flow diagram of process for transitioning from legacy touch inputs to operating system managed touch inputs. The process starts at step 56 with initiation of BIOS instructions, such as at system power up. At step 58, a PTP touch device detects touch inputs and sends the inputs to a processor with a mirror of the touch input information multidropped to an embedded controller. At step 60, PTP mouse inputs received at the embedded controller are converted at the embedded controller into legacy PS2 mouse inputs so that the PS2 legacy mouse stack receives touch input information as if interfaced with a PS2 legacy touch device. At step 62, the legacy mouse stack sends the legacy mouse inputs to the processor in accordance with legacy stack protocols and standards so that PTP touch input devices are able to communicate with the processor even though the operating system that normally handles PTP inputs is not enabled. At step 64, the operating system takes control of PTP mouse inputs provided from the PTP touch device to process inputs from an end user so that legacy mouse inputs provided from the embedded controller are disregarded. At step 66, the operating system disables legacy mouse inputs with a command to the embedded controller. In one alternative embodiment, the embedded controller automatically detects the operating system type, such as to perform other functions, and in response to detecting the type automatically disable the emulation of PS2 inputs from I2C data since the virtualize PS2 touch input device is not needed once the operating system is enabled. Although described in terms of a mouse or pointing device that provides inputs with the PTP protocol, in alternative embodiments, other types of devices that accept touch inputs from end users may be used, including touchpads, mouse, keyboards, touchscreens, etc. The conversion of I2C serial inputs at the embedded controller to legacy inputs may support other types of touch input information that is otherwise not available when an operating system is disabled or otherwise unable to support PTP.

Although the present invention has been described in detail, it should be understood that various changes, substitutions and alterations can be made hereto without departing from the spirit and scope of the invention as defined by the appended claims.

What is claimed is:

1. An information handling system comprising:
a housing;
a processor disposed in the housing and configured to execute instructions to process information;
a memory disposed in the housing and interfaced with the processor, the memory configured to store the information;
a display interfaced with the processor and memory, the display configured to present the information as visual images;
an input device configured to detect end user touches and generate touch information from the touches in a first protocol;
an embedded controller disposed in the housing and interfaced with the processor, the embedded controller configured to execute firmware instructions to manage predetermined functions of the information handling system; and
a serial link interfacing the input device and the processor to communicate the touch information to the processor, the serial link further interfaced with the embedded controller to share the touch information with the embedded controller;
wherein the embedded controller is further configured to accept the touch information in the first protocol, translate the touch information to a second protocol and forward the touch information in the second protocol to the processor; and
wherein the input device commands the embedded controller to translate the touch information when the input device lacks an operating system interface and to cease translating the touch information when the input device has an operating system interface.

2. The information handling system of claim 1 wherein the first protocol comprises a precision touch pad protocol and the second protocol comprises a PS2 mouse input protocol.

3. The information handling system of claim 1 further comprising an operating system executing on the processor and accepting the touch information in the first protocol, the processor using the touch information in the second protocol when the operating system is unable to process touch information in the first protocol.

4. The information handling system of claim 3 further comprising a mouse stack disable module integrated in the operating system and operable to command the embedded controller to disable touch inputs forwarded in the second protocol when the operating system is able to process touch information in the first protocol.

5. The portable information handling system of claim 1 wherein the serial link comprises an I2C link having a multidrop topology to share touch information with the embedded controller.

6. The information handling system of claim 1 wherein the input device comprises a touchpad integrated in the housing.

7. The information handling system of claim 1 wherein the input device comprises a mouse.

8. A method for processing touch inputs at an information handling system, the method comprising:
   detecting touch inputs at a touch device;
   converting the touch inputs into a first protocol for communication to an operating system executing on a processor through a serial link;
   sharing the communication by the serial link with an embedded controller;
   converting the touch inputs at the embedded controller from the first protocol into a second protocol; and
   communicating the touch inputs in the second protocol from the embedded controller to the processor;
   wherein the sharing the communication comprises a multidrop communication directed from the link between the touch device and operating system towards the embedded controller.

9. The method of claim 8 wherein communicating the touch inputs in the second protocol from the embedded controller to the processor further comprises communicating the touch inputs as PS2 mouse inputs to the processor through a legacy interface.

10. The method of claim 8 further comprising:
    communicating the touch inputs in the first protocol to a processor running the operating system;
    determining that the operating system is processing the touch inputs in the first protocol; and
    in response to determining, commanding the embedded controller to stop communicating the touch inputs to the processor.

11. The method of claim 10 wherein commanding the embedded controller to stop communicating the touch inputs to the processor further comprises sending a command to the embedded controller from the operating system.

12. The method of claim 10 wherein commanding the embedded controller to stop communicating the touch inputs to the processor further comprises sending a command to the embedded controller from the touch device.

13. The method of claim 8 wherein the first protocol comprises I2C formatted communications and the second protocol comprises PS2 mouse formatted communications.

14. The method of claim 8 wherein the first protocol comprises USB formatted communications and the second protocol comprises PS2 mouse formatted communications.

15. A system for managing communications between a touch device and an operating system, the system comprising:
    an embedded controller having processing resources and firmware instructions that execute on the processing resources, the embedded controller further having a physical output to provide touch device information to a processor and a physical input to accept touch device information from a touch device in a serial protocol;
    a serial pointing device converter stored in non-transitory memory accessible by the embedded controller and operable to convert the touch device information from the serial protocol into a legacy touch device protocol; and
    a legacy touch device stack stored in non-transitory memory accessible by the embedded controller and operable to communicate the converted touch device information to the physical output;
    wherein the touch device selectively commands the embedded controller to stop communicating converted touch device information to the pin out if the touch device establishes bi-directional communication with an operating system executing on the processor.

16. The system of claim 15 wherein the physical input to accept touch information at the embedded controller comprises a multidrop interface from an I2C link between the touch device and the processor.

17. The system of claim 15 wherein the serial protocol comprises a precision touch pad protocol and the legacy touch device protocol comprises a PS2 mouse touch protocol.

18. The system of claim 15 wherein the embedded controller detects an operating system type, determines the detected operating system is capable of native support of the serial protocol, and in response to detecting the operating system as operational, ceases communicating the converted touch device information.

19. An information handling system comprising:
    a housing;
    a processor disposed in the housing and configured to execute instructions to process information;
    a memory disposed in the housing and interfaced with the processor, the memory configured to store the information;
    a display interfaced with the processor and memory, the display configured to present the information as visual images;
    an input device configured to detect end user touches and generate touch information from the touches in a first protocol;
    an embedded controller disposed in the housing and interfaced with the processor, the embedded controller configured to execute firmware instructions to manage predetermined functions of the information handling system;
    a serial link interfacing the input device and the processor to communicate the touch information to the processor, the serial link further interfaced with the embedded controller to share the touch information with the embedded controller; and an operating system executing on the processor and accepting the touch information in the first protocol, the processor using the touch information in the second protocol when the operating system is unable to process touch information in the first protocol;

wherein the embedded controller is further configured to accept the touch information in the first protocol, translate the touch information to a second protocol and forward the touch information in the second protocol to the processor.

20. The information handling system of claim 19 further comprising a mouse stack disable module integrated in the operating system and operable to command the embedded controller to disable touch inputs forwarded in the second protocol when the operating system is able to process touch information in the first protocol.

21. A method for processing touch inputs at an information handling system, the method comprising:
   detecting touch inputs at a touch device;
   converting the touch inputs into a first protocol for communication to an operating system executing on a processor through a serial link;
   sharing the communication by the serial link with an embedded controller;
   converting the touch inputs at the embedded controller from the first protocol into a second protocol;
   communicating the touch inputs in the second protocol from the embedded controller to the processor;
   communicating the touch inputs in the first protocol to the processor running the operating system;
   determining that the operating system is processing the touch inputs in the first protocol; and
   in response to determining, commanding the embedded controller to stop communicating the touch inputs to the processor.

22. The method of claim 21 wherein commanding the embedded controller to stop communicating the touch inputs to the processor further comprises sending a command to the embedded controller from the operating system.

23. The method of claim 21 wherein commanding the embedded controller to stop communicating the touch inputs to the processor further comprises sending a command to the embedded controller from the touch device.

24. A system for managing communications between a touch device and an operating system, the system comprising:
   an embedded controller having processing resources and firmware instructions that execute on the processing resources, the embedded controller further having a physical output to provide touch device information to a processor and a physical input to accept touch device information from a touch device in a serial protocol;
   a serial pointing device converter stored in non-transitory memory accessible by the embedded controller and operable to convert the touch device information from the serial protocol into a legacy touch device protocol; and
   a legacy touch device stack stored in non-transitory memory accessible by the embedded controller and operable to communicate the converted touch device information to the physical output;
   wherein the embedded controller detects an operating system type, determines the detected operating system is capable of native support of the serial protocol, and in response to detecting the operating system as operational, ceases communicating the converted touch device information.

* * * * *